United States Patent
Li et al.

(10) Patent No.: US 11,486,713 B2
(45) Date of Patent: Nov. 1, 2022

(54) METHOD AND APPARATUS FOR POSITIONING AUTONOMOUS VEHICLE

(71) Applicant: Baidu Online Network Technology (Beijing) Co., Ltd., Beijing (CN)

(72) Inventors: Hao Li, Beijing (CN); Guowei Wan, Beijing (CN); Yao Zhou, Beijing (CN); Shiyu Song, Beijing (CN); Fangfang Dong, Beijing (CN)

(73) Assignee: APOLLO INTELLIGENT DRIVING (BEIJING) TECHNOLOGY CO., LTD., Beijing (CN)

( * ) Notice: Subject to any disclaimer, the term of this patent is extended or adjusted under 35 U.S.C. 154(b) by 667 days.

(21) Appl. No.: 16/508,259

(22) Filed: Jul. 10, 2019

(65) Prior Publication Data
US 2020/0064137 A1 Feb. 27, 2020

(30) Foreign Application Priority Data
Aug. 23, 2018 (CN) .......................... 201810969118.3

(51) Int. Cl.
*G06T 7/70* (2017.01)
*G01C 21/30* (2006.01)
(Continued)

(52) U.S. Cl.
CPC .............. *G01C 21/30* (2013.01); *G06F 16/29* (2019.01); *G06T 7/70* (2017.01); *G06T 7/77* (2017.01);
(Continued)

(58) Field of Classification Search
USPC .......................................... 382/103–104, 171
See application file for complete search history.

(56) References Cited

U.S. PATENT DOCUMENTS 9,945,950 B2 * 4/2018 Newman ............... G01S 17/875
10,304,237 B2 * 5/2019 Sequeira ................. G01S 17/89
(Continued)

FOREIGN PATENT DOCUMENTS

| JP | 2011002324 A | 1/2011 |
| JP | 2011034436 A | 2/2011 |

(Continued)

OTHER PUBLICATIONS

Wan et al. (2017) "Robust and Precise Vehicle Localization based on Multi-sensor Fusion in Diverse City Scenes," Baidu Autonomous Driving Business Unit in conjunction with the Apollo Project, arXiv, 8 pp.

(Continued)

*Primary Examiner* — Ishrat I Sherali
(74) *Attorney, Agent, or Firm* — Lathrop GPM LLP (57) ABSTRACT

Embodiments of the present disclosure disclose a method and apparatus for positioning an autonomous vehicle. The method includes: matching a current point cloud projected image of a first resolution with a map of the first resolution to generate a first histogram filter based on the matching result; determining at least two first response areas in the first histogram filter based on a probability value of an element in the first histogram filter; generating a second histogram filter based on a result of matching a current point cloud projected image of a second resolution with a map of the second resolution and the at least two first response areas, the first resolution being less than the second resolution; and calculating a weighted average of probability values of target elements in the second histogram filter to determine a positioning result of the autonomous vehicle in the map of the second resolution.

13 Claims, 5 Drawing Sheets

(51) Int. Cl.
 *G06F 16/29* (2019.01)
 *G06V 10/28* (2022.01)
 *G06V 10/75* (2022.01)
 *G06T 7/77* (2017.01)

(52) U.S. Cl.
 CPC ............ *G06V 10/28* (2022.01); *G06V 10/758* (2022.01); *G06T 2207/10028* (2013.01); *G06T 2207/30244* (2013.01); *G06T 2207/30248* (2013.01)

(56) References Cited

U.S. PATENT DOCUMENTS

| | | | | |
|---|---|---|---|---|
| 10,527,417 | B2* | 1/2020 | Chen | G06V 20/588 |
| 10,705,188 | B2* | 7/2020 | Wan | G05D 1/0274 |
| 11,049,267 | B2* | 6/2021 | Selviah | G06V 10/7515 |
| 11,162,788 | B2* | 11/2021 | Chen | B60W 40/06 |
| 11,373,328 | B2* | 6/2022 | Wan | G06K 9/6215 |
| 2010/0324815 | A1* | 12/2010 | Hiruta | G01C 21/30 701/532 |
| 2015/0331111 | A1* | 11/2015 | Newman | G01S 7/4808 356/4.01 |
| 2016/0096509 | A1 | 4/2016 | Ette et al. | |
| 2018/0075643 | A1* | 3/2018 | Sequeira | G05D 1/0272 |
| 2019/0206122 | A1 | 7/2019 | Zhan et al. | |

FOREIGN PATENT DOCUMENTS

| | | |
|---|---|---|
| JP | 2015194373 A | 11/2015 |
| WO | WO 2017/021474 A1 | 8/2016 |

OTHER PUBLICATIONS

Moravec, Sensor Fusion in Certainty Grids for Mobile Robots, AI Magazine, 1988, vol. 9 No. 2, pp. 61-74.
European Patent Application No. 19 184 311.9, Communication pursuant to Article 94(3) EPC, dated Apr. 13, 2021.
Burgard et al. (1996) "Estimating the Absolute Position of a Mobile Robot Using Position Probability Grids," Proc. of the Fourteenth National Conference on Artificial Intelligence (AAAI-96), 6 pp.
Levinson et al. (2010) "Robust Vehicle Localization in Urban Environments Using Probabilistic Maps," 2010 IEEE International Conference on Robotics and Automation, Anchorage Convention District, May 3-8, 2010, Anchorage, Alaska, USA, 7 pp.
Zapata et al. (2013) "Self-adaptive Monte Carlo Localization for Mobile Robots Using Range Finders," HAL Archives-Ouvertes, HAL Id: lirmm-00806955, 16 pp.

* cited by examiner

METHOD AND APPARATUS FOR POSITIONING AUTONOMOUS VEHICLE

CROSS-REFERENCE TO RELATED APPLICATIONS

This application claims priority to Chinese Application No. 201810969118.3, filed on Aug. 23, 2018 and entitled "Method and Apparatus for Positioning Autonomous Vehicle," the entire disclosure of which is hereby incorporated by reference.

TECHNICAL FIELD

Embodiments of the present disclosure relate to the field of computer technology, and in particular to, a method and apparatus for positioning an autonomous vehicle.

BACKGROUND

An autonomous vehicle is a modern vehicle that can perceive its surroundings, make decisions on the scenario, and control itself, without manual control.

The autonomous vehicle system generally includes a plurality of modules, such as a positioning module, a perception module, and a path planning module. The modules of the system compete for computing resources. In order to ensure that the whole autonomous vehicle system can run stably in real time, constrained by limited computing resources, each module needs to reduce its own computing resource occupancy as far as possible.

SUMMARY

Embodiments of the present disclosure present a method and apparatus for positioning an autonomous vehicle.

In a first aspect, an embodiment of the present disclosure provides a method for positioning an autonomous vehicle, including: matching a current point cloud projected image of a first resolution with a map of the first resolution to generate a first histogram filter based on the matching result; determining at least two first response areas in the first histogram filter based on a probability value of an element in the first histogram filter, the probability value of the element corresponding to the first response area being greater than a probability value of another element in the first histogram filter; generating a second histogram filter based on a result of matching a current point cloud projected image of a second resolution with a map of the second resolution and the at least two first response areas, the first resolution being less than the second resolution; and calculating a weighted average of probability values of target elements in the second histogram filter to determine a positioning result of the autonomous vehicle in the map of the second resolution.

In some embodiments, the generating a second histogram filter based on a result of matching a current point cloud projected image of a second resolution with a map of the second resolution and the at least two first response areas includes: mapping the determined at least two first response areas to a pre-established second histogram filter to determine a second response area in the second histogram filter; and determining a probability value of an element corresponding to the second response area in the pre-established second histogram filter based on the result of matching the current point cloud projected image of the second resolution with the map of the second resolution, to generate the second histogram filter.

In some embodiments, the first histogram filter includes at least one of a first reflection value histogram filter or a first height value histogram filter.

In some embodiments, before the matching a current point cloud projected image of a first resolution with a map of the first resolution to generate a first histogram filter based on the matching result, the method further includes: acquiring point cloud data of a specified area, and rasterizing the acquired data to obtain the map of the first resolution, where the map of the first resolution includes statistical information of reflection values and/or statistical information of height values of point clouds projected onto a grid; and acquiring point cloud data of a current frame, and rasterizing the point cloud data of the current frame to obtain the current point cloud projected image of the first resolution, where the current point cloud projected image of the first resolution includes statistical information of reflection values and/or statistical information of height values of point clouds projected onto the grid.

In some embodiments, the matching a current point cloud projected image of a first resolution with a map of the first resolution to generate a first histogram filter based on the matching result includes: matching the current point cloud projected image of the first resolution with the map of the first resolution based on statistical information of reflection values in the current point cloud projected image of the first resolution and statistical information of reflection values in the map of the first resolution, to generate a first reflection value histogram filter based on the matching result; and/or matching the current point cloud projected image of the first resolution with the map of the first resolution based on statistical information of height values of grids in the current point cloud projected image of the first resolution and statistical information of height values of grids in the map of the first resolution, to generate a first height value histogram filter based on the matching result.

In some embodiments, the determining at least two first response areas in the first histogram filter based on a probability value of an element in the first histogram filter includes: determining a contribution ratio of the first reflection value histogram filter to the at least two first response areas and a contribution ratio of the first height value histogram filter to the at least two first response areas; and determining elements corresponding to the at least two first response areas in the first reflection value histogram filter and the first height value histogram filter respectively based on the contribution ratios, to determine the at least two first response areas.

In some embodiments, the determining a probability value of an element corresponding to the second response area in the pre-established second histogram filter based on the result of matching the current point cloud projected image of the second resolution with the map of the second resolution, to generate the second histogram filter includes: acquiring a second histogram filter corresponding to a point cloud projected image of a last frame; determining a Bayesian prior probability based on a probability value of an element in the second histogram filter corresponding to the point cloud projected image of the last frame; determining a Bayesian conditional probability based on a matching degree of the current point cloud projected image of the second resolution and the map of the second resolution, obtaining the probability value of the element corresponding to the second response area in the second histogram filter using Bayes rule; and setting a probability value of other element in the second histogram filter as a preset value.

In a second aspect, an embodiment of the present disclosure provides an apparatus for positioning an autonomous vehicle, including: a first histogram filter generating unit configured for matching a current point cloud projected image of a first resolution with a map of the first resolution to generate a first histogram filter based on the matching result; a first response area determining unit configured for determining at least two first response areas in the first histogram filter based on a probability value of an element in the first histogram filter, the probability value of the element corresponding to the first response area being greater than a probability value of another element in the first histogram filter; a second histogram filter generating unit configured for generating a second histogram filter based on a result of matching a current point cloud projected image of a second resolution with a map of the second resolution and the at least two first response areas, the first resolution being less than the second resolution; and a positioning result determining unit configured for calculating a weighted average of probability values of target elements in the second histogram filter to determine a positioning result of the autonomous vehicle in the map of the second resolution.

In some embodiments, the second histogram filter generating unit includes: a second response area determining module configured for mapping the determined at least two first response areas to a pre-established second histogram filter to determine a second response area in the second histogram filter; and a probability value determining module configured for determining a probability value of an element corresponding to the second response area in the pre-established second histogram filter based on the result of matching the current point cloud projected image of the second resolution with the map of the second resolution, to generate the second histogram filter.

In some embodiments, the first histogram filter includes at least one of a first reflection value histogram filter or a first height value histogram filter.

In some embodiments, the apparatus further includes: an acquiring unit configured for acquiring point cloud data of a specified area, and rasterizing the acquired data to obtain the map of the first resolution, where the map of the first resolution includes statistical information of reflection values and/or statistical information of height values of point clouds projected onto a grid; and a rasterizing unit configured for acquiring point cloud data of a current frame, and rasterizing the point cloud data of the current frame to obtain the current point cloud projected image of the first resolution, where the current point cloud projected image of the first resolution includes statistical information of reflection values and/or statistical information of height values of point clouds projected onto the grid.

In some embodiments, the first histogram filter generating unit is further configured for: matching the current point cloud projected image of the first resolution with the map of the first resolution based on statistical information of reflection values in the current point cloud projected image of the first resolution and statistical information of reflection values in the map of the first resolution, to generate a first reflection value histogram filter based on the matching result; and/or matching the current point cloud projected image of the first resolution with the map of the first resolution based on statistical information of height values of grids in the current point cloud projected image of the first resolution and statistical information of height values of grids in the map of the first resolution, to generate a first height value histogram filter based on the matching result.

In some embodiments, the first response area determining unit is further configured for: determining a contribution ratio of the first reflection value histogram filter to the at least two first response areas and a contribution ratio of the first height value histogram filter to the at least two first response areas; and determining elements corresponding to the at least two first response areas in the first reflection value histogram filter and the first height value histogram filter respectively based on the contribution ratios, to determine the at least two first response areas.

In some embodiments, the probability value determining module is further configured for: acquiring a second histogram filter corresponding to a point cloud projected image of a last frame; determining a Bayesian prior probability based on a probability value of an element in the second histogram filter corresponding to the point cloud projected image of the last frame; determining a Bayesian conditional probability based on a matching degree of the current point cloud projected image of the second resolution and the map of the second resolution, obtaining the probability value of the element corresponding to the second response area in the second histogram filter using Bayes rule; and setting a probability value of other element in the second histogram filter as a preset value.

The method and apparatus for positioning an autonomous vehicle provided in embodiments of the present disclosure match a current point cloud projected image of a first resolution with a map of the first resolution to generate a first histogram filter, then determine at least two first response areas in the first histogram filter based on probability values of elements in the first histogram filter, then generate a second histogram filter based on a result of matching a current point cloud projected image of a second resolution with a map of the second resolution and the at least two first response areas, and finally calculate a weighted average of probability values of target elements in the second histogram filter to determine a positioning result of the autonomous vehicle in the map of the second resolution, thereby reducing computing resources consumed for positioning the autonomous vehicle.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
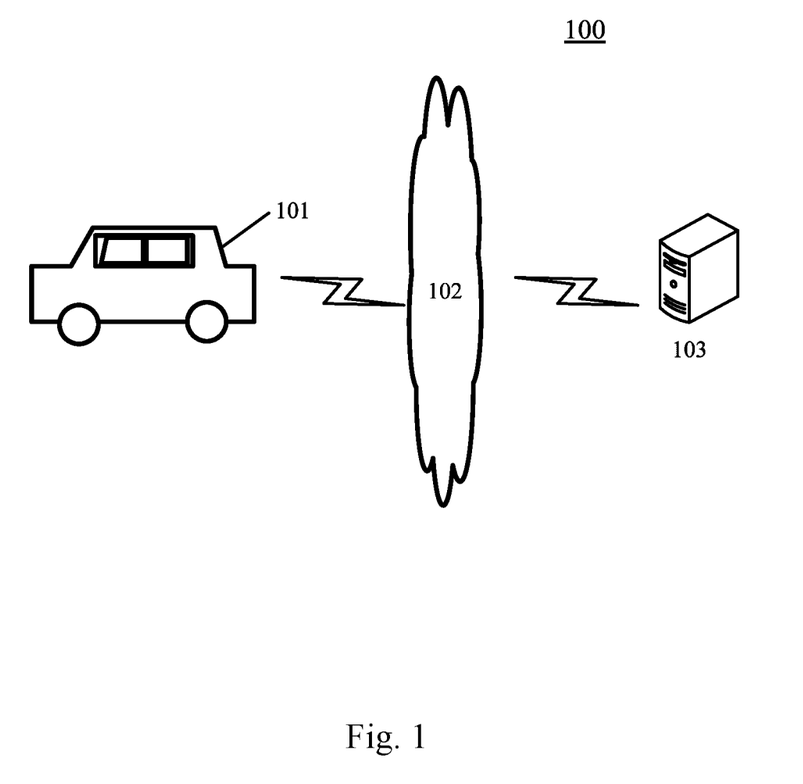
FIG. 1 is an architectural diagram of an exemplary system in which an embodiment of the present disclosure may be implemented.

FIG. 1 shows an exemplary system architecture 100 in which an embodiment of a method for positioning an autonomous vehicle or an apparatus for positioning an autonomous vehicle of the present disclosure may be implemented.

As shown in FIG. 1, the system architecture 100 may include an autonomous vehicle 101, a network 102, and a server 103. The network 102 serves as a medium providing a communication link between the autonomous vehicle 101 and the server 103. The network 102 may include various types of connections, such as wired or wireless communication links, or optical fibers.

The autonomous vehicle 101 can interact with the server 103 through the network 102, to receive or send messages, etc. A point cloud data acquisition device, a communication device, a processor, or the like may be mounted on the autonomous vehicle 101.

The server 103 may be a server providing various services, such as a server configured for processing point cloud data acquired by the autonomous vehicle 101, to generate a current point cloud projected image, etc. The server 103 can process, e.g., analyze, received point cloud data, and returns the processing result (e.g., a positioning result of the autonomous vehicle) to the autonomous vehicle 101.

It should be noted that the server may be hardware or software. When the server is hardware, the server may be implemented as a distributed server cluster composed of a plurality of servers, or may be implemented as a single server. When the server is software, the server may be implemented as a plurality of software programs or software modules (e.g., software programs or software modules for providing distributed services), or may be implemented as a single software program or software module. This is not specifically limited herein.

It should be understood that the numbers of autonomous vehicles 101, networks 102, and servers 103 in FIG. 1 are merely illustrative. Any number of autonomous vehicles 101, networks 102, and servers 103 may be provided based on actual requirements.

It should be noted that the method for positioning an autonomous vehicle provided in the embodiment of the present disclosure may be executed by the autonomous vehicle 101 or the server 103, or some steps are executed by the autonomous vehicle 101, while other steps are executed by the server 103. Accordingly, the apparatus for positioning an autonomous vehicle may be provided in the server 103 or in the autonomous vehicle 101, or some unit modules are provided in the server 103, while other unit modules are provided in the autonomous vehicle 101.

Figure 2:
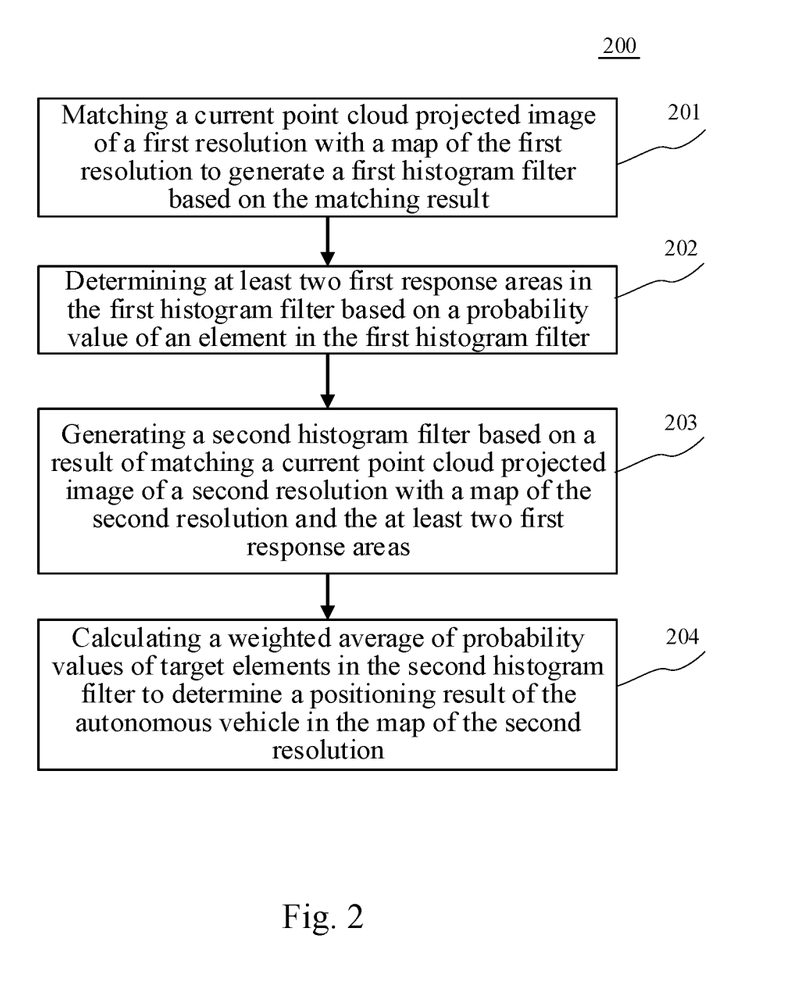
FIG. 2 is a flowchart of an embodiment of a method for positioning an autonomous vehicle according to the present disclosure.

Further referring to FIG. 2, a process 200 of an embodiment of a method for positioning an autonomous vehicle according to the present disclosure is shown. The method for positioning an autonomous vehicle includes the following steps.

Step 201, matching a current point cloud projected image of a first resolution with a map of the first resolution to generate a first histogram filter based on the matching result.

In the present embodiment, a point cloud data acquisition device on the autonomous vehicle can acquire point cloud data of a current position of the autonomous vehicle, and then project the acquired point cloud data to generate a current point cloud projected image. Further, a map can be obtained by projecting a set of pre-acquired point cloud data. It will be appreciated that current cloud point projected images and maps of different resolutions can be obtained by decreasing or increasing resolution ratios of a current point cloud projected image and a map. An executing body (e.g., the server shown in FIG. 1) of the method for positioning an autonomous vehicle can first acquire a current point cloud projected image of a first resolution and a map of the first resolution, and then match the current point cloud projected image of the first resolution with the map of the first resolution.

Specifically, a predetermined position may be used as a start position of the map of the first resolution, and the current point cloud projected image of the first resolution is moved from the start position of the map of the first resolution by a predetermined offset for matching, to obtain a corresponding probability value, i.e., the matching result. Finally, a first histogram filter can be generated based on the probability value obtained by matching.

In some alternative implementations of the present embodiment, point cloud data of a specified area can be pre-acquired, and the acquired point cloud data can be rasterized to obtain the map of the first resolution. The map of the first resolution may include statistical information of reflection values and/or statistical information of height values of point clouds projected onto a grid. Further, point cloud data of a current frame are acquired, and are rasterized to obtain the current point cloud projected image of the first resolution. The current point cloud projected image of the first resolution may include statistical information of reflection values and/or statistical information of height values of point clouds projected onto the grid.

Generally, the current point cloud projected image of the first resolution and the map of the first resolution may be generated as follows.

First, for map data of a given specific resolution, the map may be a rasterized image obtained by projecting a set of pre-acquired point cloud data onto a plane, such as a world coordinate system. Here, the map resolution usually refers to the size of each grid in the rasterized image. Each grid in the map of the specific resolution may include statistical information of reflection values and/or statistical information of height values of points projected onto the grid. The statistical information of reflection values may include average reflection value, reflection value variance, count of point clouds falling within the grid, or the like. The statistical information of height values may include average height value, count of point clouds falling within the grid, or the like.

Then, the current point cloud projected image of the specific resolution can be obtained by projecting the point cloud data of the current frame at the specific resolution.

Finally, the map of the first resolution and the current point cloud projected image of the first resolution can be generated based on the map of the specific resolution and the current point cloud projected image of the specific resolution. Further, the statistical information of reflection values and/or statistical information of height values of point clouds projected onto the grid included in the map of the first resolution, and statistical information of reflection values and/or statistical information of height values of point clouds projected onto the grid included in the current point cloud projected image of the first resolution may be recalculated.

As an example, suppose size of the map of the specific resolution or the current point cloud projected image of the specific resolution is n×n, and the resolution reduction ratio is calculated to be s, then size of the map of the first resolution or the current point cloud projected image of the first resolution may be (n/s)×(n/s). Specifically, s×s grids in the map of the specific resolution and the current point cloud projected image of the specific resolution can be combined into one grid respectively.

In some alternative implementations of the present embodiment, the first histogram filter may include at least one of a first reflection value histogram filter or a first height value histogram filter.

Step 202, determining at least two first response areas in the first histogram filter based on a probability value of an element in the first histogram filter.

In the present embodiment, the executing body can acquire probability values of elements in the first histogram filter based on the first histogram filter obtained in Step 201, then select at least two highest probability values therefrom, and determine areas corresponding to the selected probability values as first response areas. It can be seen that, the selected at least two first response areas may be areas having greatest matching degrees of the current point cloud projected image of the first resolution and the map of the first resolution, i.e., the autonomous vehicle is at a position corresponding to the first response area. At this step, the autonomous vehicle can be roughly positioned.

Step 203, generating a second histogram filter based on a result of matching a current point cloud projected image of a second resolution with a map of the second resolution and the at least two first response areas.

In the present embodiment, a current point cloud projected image of a second resolution and a map of the second resolution may be pre-generated. Here, the second resolution is greater than the first resolution. That is, compared with the current point cloud projected image of the first resolution and the map of the first resolution, the current point cloud projected image of the second resolution is a high-resolution current point cloud projected image, and the map of the second resolution is a high-resolution map. Then, a second histogram filter is obtained by calculation based on a matching degree of the current point cloud projected image of the second resolution and the map of the second resolution for the determined at least two first response areas. Compared with the resolution of the first histogram filter, the second histogram filter is a high-resolution histogram filter.

Step 204, calculating a weighted average of probability values of target elements in the second histogram filter to determine a positioning result of the autonomous vehicle in the map of the second resolution.

In the present embodiment, the executing body can determine target elements meeting a preset condition in the second histogram filter based on the second histogram filter generated in Step 203, and then calculate a weighted average of probability values corresponding to the determined target elements, thereby determining the position of the autonomous vehicle in the map of the second resolution. Here, the target elements meeting the preset condition may be an element having a highest probability value in the second histogram filter and elements around the element.

Thus it can be seen that, the method for positioning an autonomous vehicle provided in the present embodiment may be understood as a method for positioning an autonomous vehicle based on point cloud data from rough positioning to fine positioning by first zooming down, using a current point cloud projected image and a map of a low resolution (first resolution), the range of a positioning result in the map, and then more accurately positioning within the zoomed range, thereby reducing computing resource occupancy in the process of positioning the autonomous vehicle.

The method for positioning an autonomous vehicle provided in the above embodiments of the present disclosure matches a current point cloud projected image of a first resolution with a map of the first resolution to generate a first histogram filter, then determines at least two first response areas in the first histogram filter based on probability values of elements in the first histogram filter, then generates a second histogram filter based on a result of matching a current point cloud projected image of a second resolution with a map of the second resolution and the at least two first response areas, and finally calculates a weighted average of probability values of target elements in the second histogram filter to determine a positioning result of the autonomous vehicle in the map of the second resolution, thereby reducing computing resources consumed for positioning the autonomous vehicle.

Figure 3:
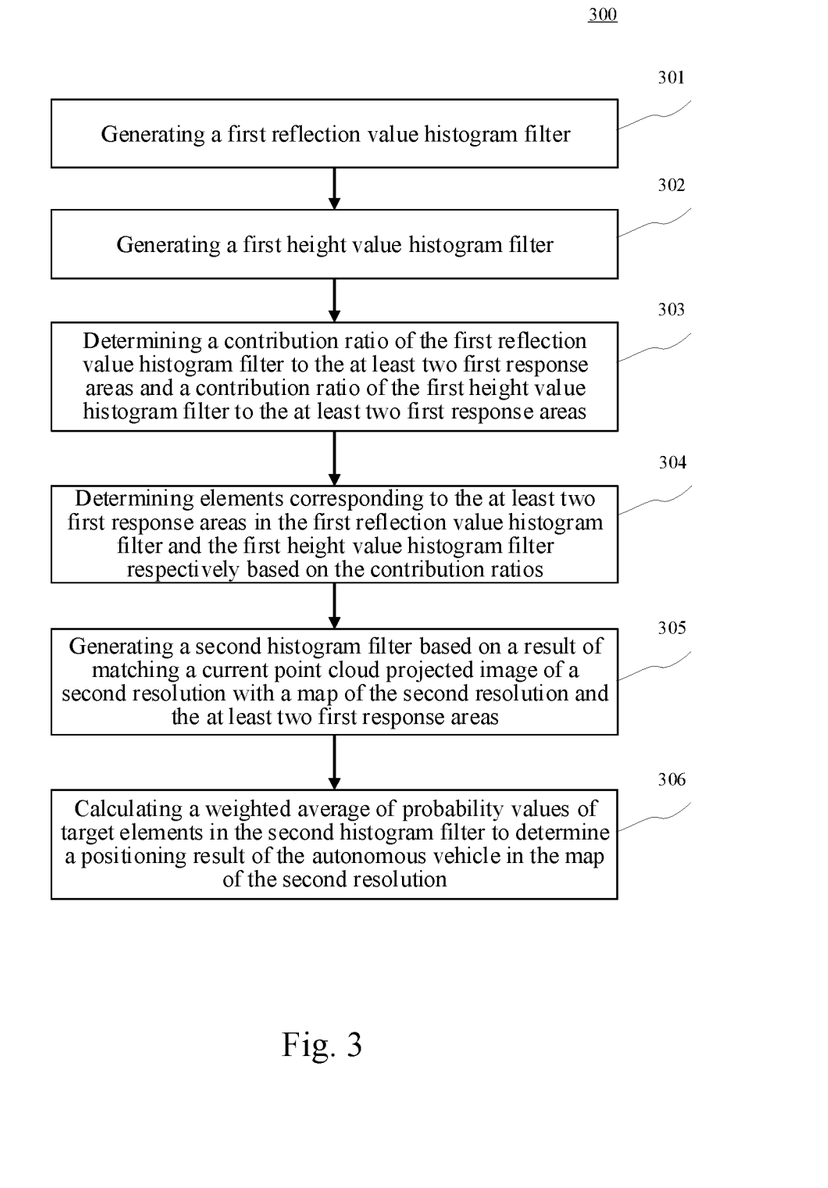
FIG. 3 is a flowchart of another embodiment of the method for positioning an autonomous vehicle according to the present disclosure.

Further referring to FIG. 3, a process 300 of another embodiment of the method for positioning an autonomous vehicle is shown. The process 300 of the method for positioning an autonomous vehicle includes the following steps.

Step 301, generating a first reflection value histogram filter.

The first histogram filter can be obtained by matching a current point cloud projected image of a first resolution with a map of the first resolution. The current point cloud projected image of the first resolution may be a rasterized image, and each grid of the rasterized current point cloud projected image may include statistical information of reflection values of point clouds projected onto the grid. Likewise, the map of the first resolution may also be a rasterized image, and each grid of the rasterized map may include statistical information of reflection values of point clouds projected onto the grid.

The statistical information of reflection values may include average reflection value, reflection value variance, or the like.

In the present embodiment, an executing body (e.g., the server shown in FIG. 1) of the method for positioning an autonomous vehicle can pre-acquire statistical information of reflection values in the current point cloud projected image of the first resolution and statistical information of reflection values in the map of the first resolution, then match the current point cloud projected image of the first resolution with the map of the first resolution based on the acquired statistical information of reflection values, and process the matching result to obtain the first reflection value histogram filter.

It will be appreciated that the generated first reflection value histogram filter is a l×l filter. Here, it is necessary to calculate a probability value of each element in the l×l first reflection value histogram filter. A probability value $P_r(x, y)$ of any one element (x, y) in the first reflection value histogram filter can be obtained by calculation using Equation (1):

$$P_r(x, y) = \eta_1 \times \alpha_1^{-\frac{\lambda_1 \times SSD_r}{2 \times N_z}} \quad \text{Equation (1)}$$

$SSD_r$ is the matching degree of reflection values of the current point cloud projected image of the first resolution and the map of the first resolution, cf. Equation (2) for calculation, $N_z$ is the number of grids in the current point cloud projected image of the first resolution, $\alpha_1$ is a preset adjustable parameter, $\eta_1$ is a normalized parameter, and $\lambda_1$ is a preset constant.

$$SSD_r = \sum_{(i,j)} \frac{(r_{m_{(i-x,j-y)}} - r_{z_{(i,j)}})^2 \times (\sigma^2_{m_{(i-x,j-y)}} + \sigma^2_{z_{(i,j)}})}{\sigma^2_{m_{(i-x,j-y)}} \times \sigma^2_{z_{(i,j)}}} \quad \text{Equation (2)}$$

Here, (i, j) is (i, j)-th point in the map of the first resolution, $r_{m_{(i-x,j-y)}}$ is an average reflection value of point clouds in (i-x, j-y)-th grid of the map of the first resolution, $r_{z_{(i,j)}}$ is an average reflection value of point clouds in (i, j)-th grid of the current point cloud projected image of the first resolution, $\sigma_{m_{(i-x,j-y)}}$ is a standard deviation of reflection values of point clouds in the (i-x, j-y)-th grid of the map of the first resolution, and $\sigma_{z_{(i,j)}}$ is a standard deviation of point clouds in the (i, j)-th grid of the current point cloud projected image of the first resolution.

Step 302, generating a first height value histogram filter.

Similar to Step 301, the first height value histogram filter can also be obtained by matching the current point cloud projected image of the first resolution with the map of the first resolution. The current point cloud projected image of the first resolution may be a rasterized image, and each grid of the rasterized current point cloud projected image may include statistical information of height values of point clouds projected onto the grid. Likewise, the map of the first resolution may also be a rasterized image, and each grid of the rasterized map may include statistical information of height values of point clouds projected onto the grid. The statistical information of height values may include average height value, and the like.

In the present embodiment, the executing body can pre-acquire statistical information of height values in the current point cloud projected image of the first resolution and statistical information of height values in the map of the first resolution, then match the current point cloud projected image of the first resolution with the map of the first resolution based on the acquired statistical information of height values, and process the matching result to generate the first height value histogram filter.

It will be appreciated that the generated first height value histogram filter is a l×l filter. Here, it is necessary to calculate a probability value of each element in the l×l first height value histogram filter. A probability value $P_a(x, y)$ of an element (x, y) in the first height value histogram filter can be obtained by calculation using Equation (3):

$$P_a(x, y) = \eta_2 \times \alpha_2^{-\frac{\lambda_2 \times SSD_a}{2 \times N_z}} \quad \text{Equation (3)}$$

$SSD_\alpha$ is the matching degree of height values of the current point cloud projected image of the first resolution and the map of the first resolution, cf. Equation (4) for calculation, $N_z$ is the number of grids in the current point cloud projected image of the first resolution, $\alpha_2$ is a preset adjustable parameter, $\eta_2$ is a normalized parameter, and $\lambda_2$ is a preset constant.

$$SSD_\alpha = \Sigma_{(i,j)}(\alpha_{m_{(i-x,j-y)}} - \alpha_{z_{(i,j)}}) \quad \text{Equation (4)}$$

Here, (i, j) is (i, j)-th point in the map of the first resolution, $\alpha_{m_{(i-x,j-y)}}$ is an average height value of point clouds in (i-x, j-y)-th grid of the map of the first resolution, and $\alpha_{z_{(i,j)}}$ is an average height value of point clouds in (i, j)-th grid of the current point cloud projected image of the first resolution.

Step 303, determining a contribution ratio of the first reflection value histogram filter to the at least two first response areas and a contribution ratio of the first height value histogram filter to the at least two first response areas.

In the present embodiment, based on the first reflection value histogram filter and the first height value histogram filter determined in Steps 301 and 302, the executing body can analyze probability value distribution of elements in the two first histogram filters, to determine a contribution ratio of the first reflection value histogram filter to the at least two first response areas, and a contribution ratio of the first height value histogram filter to the at least two first response areas.

It will be appreciated that contribution ratio $w_a$ of the first height value histogram filter and contribution ratio $w_r$ of the first reflection value histogram filter can be calculated using the following Equation (5) and Equation (6):

$$w_r = \frac{(\sigma_x^2(a) + \sigma_y^2(a)) \times dc_a}{(\sigma_x^2(a) + \sigma_y^2(a)) \times dc_a + (\sigma_x^2(r) + \sigma_y^2(r)) \times dc_r} \quad \text{Equation (5)}$$

$$w_a = 1 - w_r \quad \text{Equation (6)}$$

Here, $dc_r$ is a distance between center position and mass center of the first reflection value histogram filter, $dc_\alpha$ is a distance between center position and mass center of the first height value histogram filter, $\sigma_x^2(\alpha)$ is a variance of the of the first height value histogram filter distributed in an x direction, $\sigma_y^2(\alpha)$ is a variance of the first height value histogram filter distributed in a y direction, $\sigma_x^2(r)$ is a variance of the first reflection value histogram filter distributed in an x direction, and $\sigma_y^2(r)$ is a variance of the first reflection value histogram filter distributed in a y direction.

Further, $\sigma_x^2(\alpha)$ and $\sigma_y^2(\alpha)$ of the first height value histogram filter can be calculated respectively using the following Equation (7) and Equation (8):

$$\sigma_x^2(a) = \frac{\sum_{(x,y)} P_a(x, y)^\beta \times (x - \bar{x})^2}{\sum_{(x,y)} P_a(x, y)^\beta} \quad \text{Equation (7)}$$

$$\sigma_y^2(a) = \frac{\sum_{(x,y)} P_a(x, y)^\beta \times (y - \bar{y})^2}{\sum_{(x,y)} P_a(x, y)^\beta} \quad \text{Equation (8)}$$

Here, (x, y) is (x, y)-th element in the first height value histogram filter, $P_\alpha(x,y)$ is a probability value of the (x, y)-th element in the first height value histogram filter, $\beta$ is a preset adjustable parameter, and $\bar{x}$ and $\bar{y}$ are respectively values corresponding to the mass center of the first height value histogram filter.

Likewise, $\sigma_x^2(r)$ and $\sigma_y^2(r)$ of the first reflection value histogram filter can be calculated similarly, and will not be repeated here.

Step 304, determining elements corresponding to the at least two first response areas in the first reflection value histogram filter and the first height value histogram filter respectively based on the contribution ratios.

In the present embodiment, based on the contribution ratio $w_a$ of the first height value histogram filter and the contribution ratio $w_r$ of the first reflection value histogram filter determined in Step 303, the executing body can calculate the number of the first response areas in the first reflection value histogram filter and the first height value histogram filter based on the obtained contribution ratios. For example, the executing body needs to determine k first response areas, then the number of the first response areas in the first reflection value histogram filter is k×$w_r$, and the number of the first response areas in the first height value histogram filter is k×$w_a$.

Step 305, generating a second histogram filter based on a result of matching a current point cloud projected image of a second resolution with a map of the second resolution and the at least two first response areas.

In the present embodiment, a current point cloud projected image of a second resolution and a map of the second resolution may be pre-generated. Here, the second resolution is greater than the first resolution. That is, compared with the current point cloud projected image of the first resolution and the map of the first resolution, the current point cloud projected image of the second resolution is a high-resolution current point cloud projected image, and the map of the second resolution is a high-resolution map. Then, a second histogram filter is obtained by calculation based on a matching degree of the current point cloud projected image of the second resolution and the map of the second resolution for the determined at least two first response areas. Compared with the resolution of the first histogram filter, the second histogram filter is also a high-resolution histogram filter.

In some alternative implementations of the present embodiment, the executing body can map the determined at least two first response areas to a pre-established second histogram filter to determine a second response area in the second histogram filter. Then, the executing body can match the current point cloud projected image of the second resolution with the map of the second resolution, and calculate a probability value of an element corresponding to the second response area in the pre-established second histogram filter based on the matching result, to generate the second histogram filter.

It will be appreciated that before calculating the second histogram filter corresponding to the current point cloud projected image, the executing body has calculated the second histogram filter corresponding to a point cloud projected image of a last frame. The executing body can pre-acquire the second histogram filter corresponding to the point cloud projected image of the last frame, and then determine a Bayesian prior probability based on a probability value of each element in the acquired second histogram filter corresponding to the point cloud projected image of the last frame. Then, a Bayesian conditional probability can be determined based on a matching degree of the current point cloud projected image of the second resolution and the map of the second resolution, so that the executing body can obtain the probability value of the element corresponding to the second response area in the second histogram filter using Bayes rule. The probability value is a Bayesian posterior probability. Finally, a probability value of an element corresponding to other area except for the second response area in the second histogram filter is set as a preset threshold (e.g., zero).

Specifically, the probability value P(x,y|z,m) of the element corresponding to the second response area in the second histogram filter can be calculated using the following Equation (9):

$$P(x,y|z,m) = \eta_3 \times P(z|x,y,m) \times P(x,y) \qquad \text{Equation (9)}$$

Here, P (x, y) is a Bayesian prior probability, P(z|x,y,m) is a Bayesian conditional probability, and $\eta_3$ is a normalized parameter.

Further, the Bayesian prior probability P (x, y) can be calculated using Equation (10) and Equation (11):

$$P(x, y) = \left(\overline{P}(x, y)\right)^{1/K} \qquad \text{Equation (10)}$$

$$\overline{P}(x, y) = \eta_4 \times \sum_{(i',j')} P(i', j') \times \exp\left(-\frac{(i'-x)^2 + (j'-y)^2}{2v^2}\right) \qquad \text{Equation (11)}$$

Here, (i',j') is (i',j')-th element in the second histogram filter corresponding to the point cloud projected image of the last frame, P(i',j') is a probability value of an element (i',j') in the second histogram filter corresponding to the point cloud projected image of the last frame, $\eta_4$ is a normalized parameter, K is a KL divergence of $\Sigma_{(x,y)} P(z|x,y,m)$ and $\Sigma_{(x,y)} \overline{P}(x,y)$, and v represents a speed of the autonomous vehicle. The speed can be obtained by processing a speed of acquiring point cloud data of the current frame and point cloud data of the last frame by the autonomous vehicle.

The Bayesian conditional probability P(z|x,y,m) can be obtained by calculation using the following Equation (12):

$$P(z|x,y,m) = \eta_5 \times P(z_r|x,y,m)^{w_r} \times P(z_\alpha|x,y,m)^{w_\alpha} \qquad \text{Equation (12)}$$

Here, $w_a$ and $w_r$ are obtained by calculation using Equation (5) and Equation (6) respectively, $P(z_r|x,y,m)$ represents a matching degree of reflection values of the current point cloud projected image of the second resolution and the map of the second resolution, and $P(z_\alpha|x,y,m)$ represents a matching degree of height values of the current point cloud projected image of the second resolution and the map of the second resolution. Therefore, the calculation of the above $P(z_r|x,y,m)$ and $P(z_\alpha|x,y,m)$ may be identical to the calculation of $P_r$ (x, y) in Equation (1) and $P_\alpha$ (x, y) in Equation (3), and will not be repeated here.

Step 306, calculating a weighted average of probability values of target elements in the second histogram filter to determine a positioning result of the autonomous vehicle in the map of the second resolution.

In the present embodiment, the executing body can determine target elements meeting a preset condition in the second histogram filter based on the second histogram filter generated in Step 305, and then calculate a weighted average of probability values corresponding to the determined target elements, thereby determining the position of the autonomous vehicle in the map of the second resolution. Here, the target elements meeting the preset condition may be an element having a highest probability value in the second histogram filter and elements around the element.

Here, the final positioning result $(\hat{x}, \hat{y})$ of the autonomous vehicle can be obtained by calculation using the following Equation (13) and Equation (14):

$$\hat{x} = \frac{\sum\limits_{(x,y)\in Z} P(x, y)^\beta \times x}{\sum\limits_{(x,y)\in Z} P(x, y)^\beta} \qquad \text{Equation (13)}$$

$$\hat{y} = \frac{\sum\limits_{(x,y)\in Z} P(x, y)^\beta \times y}{\sum\limits_{(x,y)\in Z} P(x, y)^\beta} \qquad \text{Equation (14)}$$

Here, (x, y) is (x, y)-th element in the second histogram filter, Z is an area including a point having a highest probability in the second histogram filter and other points around the point, and β is a preset adjustable parameter.

In some alternative implementations of the present embodiment, after obtaining the positioning result of the autonomous vehicle by calculation, the executing body can further calculate the confidence level of the positioning result, thereby determining the accuracy of the positioning result.

Here, the executing body can calculate the confidence level of the positioning result as follows.

First, the acquired first reflection value histogram filter and the acquired first height value histogram filter are integrated to obtain an integrated first histogram filter. A probability value Pc(x,y) of an element (x, y) in the integrated first histogram filter is calculated using Equation (15) as follows:

$$Pc(x,y) = \eta_6 \times P_r(x,y)^{w_r} \times P_\alpha(x,y)^{w_\alpha} \qquad \text{Equation (15)}$$

Here, $\eta_6$ is a normalized parameter, $w_a$ and $w_r$ are obtained by calculation using Equation (5) and Equation (6) respectively, and $P_r$ (x, y) and $P_\alpha$ (x, y) are obtained by calculation using Equation (1) and Equation (3) respectively.

Then, confidence levels $u_x$ and $u_y$ of $\hat{x}$ and $\hat{y}$ in the positioning result $(\hat{x},\hat{y})$ are calculated, and Equation (16) and Equation (17) for calculating $u_x$ and $u_y$ are shown below:

$$u_x = \lambda \times \sigma_x \times \gamma^{ratio} \qquad \text{Equation (16)}$$

$$u_y = \lambda \times \sigma_y \times \gamma^{ratio} \qquad \text{Equation (17)}$$

Here, λ and γ are preset variable parameters, $\sigma_x$ and $\sigma_y$ are standard deviations of the integrated first histogram filter distributed in x and y directions, and ratio represents a distance between center position and mass center of the integrated first histogram filter.

As can be seen from FIG. 3, compared with the embodiment corresponding to FIG. 2, the process 300 of the method for positioning an autonomous vehicle in the present embodiment highlights generating a first reflection value histogram filter, a first height value histogram filter, and a second histogram filter. Accordingly, the positioning result determined based on the solutions described in the present embodiment is more stable and accurate.

Figure 4:
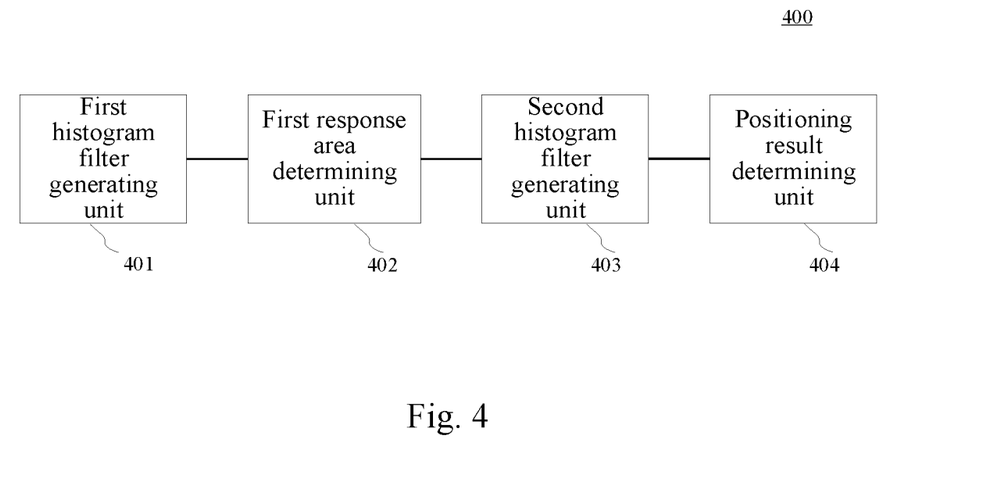
FIG. 4 is a schematic structural diagram of an embodiment of an apparatus for positioning an autonomous vehicle according to the present disclosure.

Further referring to FIG. 4, as an implementation of the method shown in the above figures, the present disclosure provides an embodiment of an apparatus for positioning an autonomous vehicle. The embodiment of the apparatus corresponds to the embodiment of the method shown in FIG. 2, and the apparatus may be specifically applied in various electronic devices.

As show in FIG. 4, the apparatus 400 for positioning an autonomous vehicle of the present embodiment includes: a first histogram filter generating unit 401, a first response area determining unit 402, a second histogram filter generating unit 403, and a positioning result determining unit 404. The first histogram filter generating unit 401 is configured for matching a current point cloud projected image of a first resolution with a map of the first resolution to generate a first histogram filter based on the matching result; the first response area determining unit 402 is configured for determining at least two first response areas in the first histogram filter based on a probability value of an element in the first histogram filter, the probability value of the element corresponding to the first response area being greater than a probability value of another element in the first histogram filter; the second histogram filter generating unit 403 is configured for generating a second histogram filter based on a result of matching a current point cloud projected image of a second resolution with a map of the second resolution and the at least two first response areas, the first resolution being less than the second resolution; and the positioning result determining unit 404 is configured for calculating a weighted average of probability values of target elements in the second histogram filter to determine a positioning result of the autonomous vehicle in the map of the second resolution.

In some alternative implementations of the present embodiment, the second histogram filter generating unit 403 includes: a second response area determining module configured for mapping the determined at least two first response areas to a pre-established second histogram filter to determine a second response area in the second histogram filter; and a probability value determining module configured for determining a probability value of an element corresponding to the second response area in the pre-established second histogram filter based on the result of matching the current point cloud projected image of the second resolution with the map of the second resolution, to generate the second histogram filter.

In some alternative implementations of the present embodiment, the first histogram filter may include at least one of a first reflection value histogram filter or a first height value histogram filter.

In some alternative implementations of the present embodiment, the apparatus 400 further includes: an acquiring unit configured for acquiring point cloud data of a specified area, and rasterizing the acquired data to obtain the map of the first resolution, where the map of the first resolution includes statistical information of reflection values and/or statistical information of height values of point clouds projected onto a grid; and a rasterizing unit configured for acquiring point cloud data of a current frame, and rasterizing the point cloud data of the current frame to obtain the current point cloud projected image of the first resolution, where the current point cloud projected image of the first resolution includes statistical information of reflection values and/or statistical information of height values of point clouds projected onto the grid.

In some alternative implementations of the present embodiment, the first histogram filter generating unit 401 is further configured for: matching the current point cloud projected image of the first resolution with the map of the first resolution based on statistical information of reflection values in the current point cloud projected image of the first resolution and statistical information of reflection values in the map of the first resolution, to generate a first reflection value histogram filter based on the matching result; and/or matching the current point cloud projected image of the first resolution with the map of the first resolution based on statistical information of height values of grids in the current point cloud projected image of the first resolution and statistical information of height values of grids in the map of the first resolution, to generate a first height value histogram filter based on the matching result.

In some alternative implementations of the present embodiment, the first response area determining unit 402 is further configured for: determining a contribution ratio of the first reflection value histogram filter to the at least two first response areas and a contribution ratio of the first height value histogram filter to the at least two first response areas; and determining elements corresponding to the at least two first response areas in the first reflection value histogram filter and the first height value histogram filter respectively based on the contribution ratios, to determine the at least two first response areas.

In some alternative implementations of the present embodiment, the probability value determining module is further configured for: acquiring a second histogram filter corresponding to a point cloud projected image of a last frame; determining a Bayesian prior probability based on a probability value of an element in the second histogram filter corresponding to the point cloud projected image of the last frame; determining a Bayesian conditional probability based on a matching degree of the current point cloud projected image of the second resolution and the map of the second resolution, obtaining the probability value of the element corresponding to the second response area in the second histogram filter using Bayes rule; and setting a probability value of other element in the second histogram filter as a preset value.

The units disclosed in the apparatus 400 may correspond to the steps in the method described in FIG. 2 and FIG. 3. Therefore, the operations and characteristics described above for the method also apply to the apparatus 400 and the units included therein, and will not be repeated here.

Figure 5:
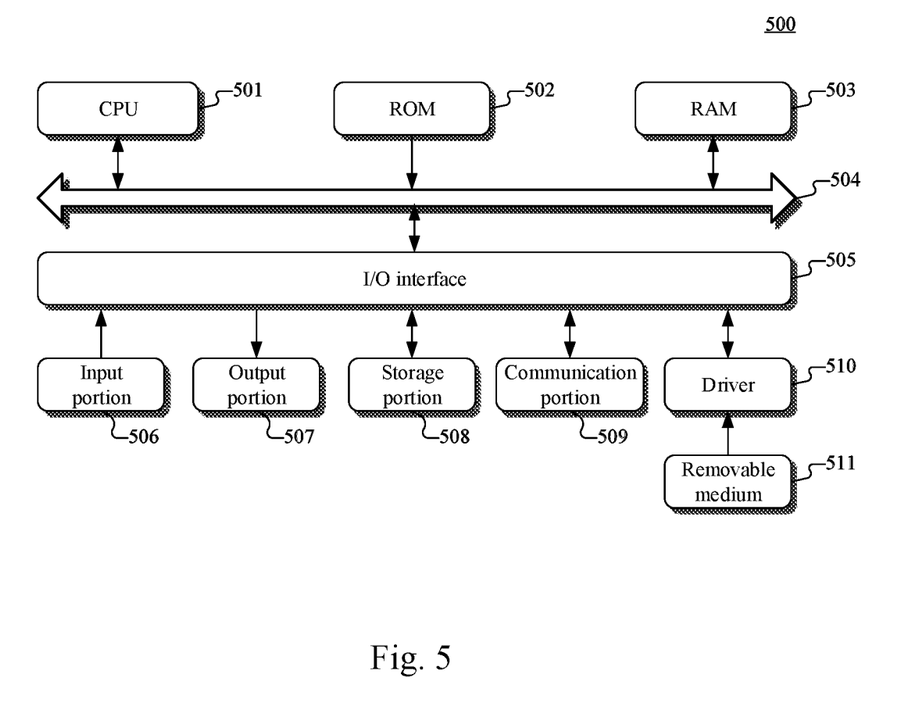
FIG. 5 is a schematic structural diagram of a computer system adapted to implement an electronic device of the embodiments of the present disclosure.

Referring to FIG. 5, a schematic structural diagram of a computer system 500 adapted to implement an electronic device of the embodiments of the present disclosure is shown. The electronic device shown in FIG. 5 is merely an example, and should not limit the function and scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse, or the like; an output portion 507 including a cathode ray tube (CRT), a liquid crystal display device (LCD), a speaker, or the like; a storage portion 508 including a hard disk or the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, so that a computer program read therefrom is installed on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable medium 511. The computer program, when executed by the CPU 501, implements the functions as defined by the methods of the present disclosure. It should be noted that the computer readable medium in the present disclosure may be computer readable signal medium or computer readable storage medium or any combination of the above two. An example of the computer readable storage medium may include, but is not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a first histogram filter generating unit, a first response area determining unit, a second histogram filter generating unit, and a positioning result determining unit.

Here, the names of these units do not in some cases constitute a limitation to such units themselves. For example, the first histogram filter generating unit may also be described as "a unit configured to match a current point cloud projected image of a first resolution with a map of the first resolution to generate a first histogram filter based on the matching result."

In another aspect, the present disclosure further provides a computer-readable medium. The computer-readable storage medium may be included in the apparatus in the above described embodiments, or a stand-alone computer-readable medium not assembled into the apparatus. The computer-readable medium stores one or more programs. The one or more programs, when executed by the apparatus, cause the apparatus to: matching a current point cloud projected image of a first resolution with a map of the first resolution to generate a first histogram filter based on the matching result; determining at least two first response areas in the first histogram filter based on a probability value of an element in the first histogram filter, the probability value of the element corresponding to the first response area being greater than a probability value of another element in the first histogram filter; generating a second histogram filter based on a result of matching a current point cloud projected image of a second resolution with a map of the second resolution and the at least two first response areas, the first resolution being less than the second resolution; and calculating a weighted average of probability values of target elements in the second histogram filter to determine a positioning result of the autonomous vehicle in the map of the second resolution.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for positioning an autonomous vehicle, comprising:
   matching a current point cloud projected image of a first resolution with a map of the first resolution to generate a first histogram filter based on the matching result;
   determining at least two first response areas in the first histogram filter based on a probability value of an element in the first histogram filter, the probability value of the element corresponding to each of the at least two first response areas being greater than a probability value of another element in the first histogram filter;
   generating a second histogram filter corresponding to a current point cloud projected image of a second resolution based on a result of matching the current point cloud projected. image of the second resolution with a map of the second resolution and the at least two first response areas, the first resolution being less than the second resolution by: mapping the determined at least two first response areas to a pre-established second histogram filter to determine a second response area in the pre-established second histogram filter; and determining a probability value of an element corresponding to the second response area in the pre-established second histogram filter based on the result of matching the current point cloud projected image of the second resolution with the map of the second resolution, to generate the second histogram filter corresponding to the current point cloud projected image of the second resolution; and
   calculating a weighted average of probability values of target elements in the second histogram filter to determine a positioning result of the autonomous vehicle in the map of the second resolution.

2. The method according to claim 1, wherein the first histogram filter comprises at least one of a first reflection value histogram filter or a first height value histogram filter.

3. The method according to claim 1, wherein before the matching a current point cloud projected image of a first resolution with a map of the first resolution to generate a first histogram filter based on the matching result, the method further comprises:
   acquiring point cloud data of a specified area, and rasterizing the acquired data to obtain the map of the first resolution, wherein the map of the first resolution comprises statistical information of reflection values and/or statistical information of height values of point clouds projected onto a grid; and
   acquiring point cloud data of a current frame, and rasterizing the point cloud data of the current frame to obtain the current point cloud projected image of the first resolution, wherein the current point cloud projected image of the first resolution comprises statistical information of reflection values and/or statistical information of height values of point clouds projected onto the grid.

4. The method according to claim 3, wherein the matching a current point cloud projected image of a first resolution with a map of the first resolution to generate a first histogram filter based on the matching result comprises:
   matching the current point cloud projected image of the first resolution with the map of the first resolution based on statistical information of reflection values in the current point cloud projected image of the first resolution and statistical information of reflection values in the map of the first resolution, to generate a first reflection value histogram filter based on the matching result; and/or matching the current point cloud projected image of the first resolution with the map of the first resolution based on statistical information of height values of grids in the current point cloud projected image of the first resolution and statistical information of height values of grids in the map of the first resolution, to generate a first height value histogram filter based on the matching result.

5. The method according to claim 2, wherein the determining at least two first response areas in the first histogram filter based on a probability value of an element in the first histogram filter comprises:

determining a contribution ratio of the first reflection value histogram filter to the at least two first response areas and a contribution ratio of the first height value histogram filter to the at least two first response areas; and determining elements corresponding to the at least two first response areas in the first reflection value histogram filter and the first height value histogram filter respectively based on the contribution ratios, to determine the at least two first response areas.

6. The method according to claim 1, wherein the determining a. probability value of an element corresponding to the second response area in the pre-established second histogram filter based on the result of matching the current point cloud projected image of the second resolution with the map of the second resolution, to generate the second histogram filter corresponding to the current point cloud projected image of the second resolution comprises:

acquiring a second histogram filter corresponding to a point cloud projected image of a last frame;

determining a Bayesian prior probability based on a probability value of an element in the second histogram filter corresponding to the point cloud projected image of the last frame;

determining a Bayesian conditional probability based on a matching degree of the current point cloud projected image of the second resolution and the map of the second resolution, obtaining the probability value of the element corresponding to the second response area in the second histogram filter using Bayes rule; and setting a probability value of other element the second histogram filter as a preset value.

7. An apparatus for positioning an autonomous vehicle, comprising:

at least one processor; and a memory storing instructions, the instructions when executed by the at least one processor, cause the at least one processor to perform operations, the Operations comprising:

matching a current point cloud projected image of a first resolution with a map of the first resolution to generate a first histogram filter based on the matching result;

determining at least two first response areas in the first histogram filter based on a probability value of an element in the first histogram filter, the probability value of the element corresponding to each of the at least two first response areas being greater than a probability value of another element in the first histogram filter;

generating a second histogram filter corresponding to a current point cloud projected image of a second resolution based on a result of matching the current point cloud projected image of the second resolution with a map of the second resolution and the at least two first response areas, the first resolution being less than the second resolution by: mapping the determined at least two first response areas to a pre-established second histogram filter to determine a second response area in the pre-established second histogram filter; and determining a probability value of an element corresponding to the second response area in the pre-established second histogram filter based on the result of matching the current point cloud projected image of the second resolution with the map of the second resolution, to generate the second histogram filter corresponding to the current point cloud projected image of the second. resolution; and calculating a weighted average of probability values of target elements in the second histogram filter to determine a positioning result of the autonomous vehicle in the map of the second resolution.

8. The apparatus according to claim 7, wherein the first histogram filter comprises at least one of a first reflection value histogram filter or a first height value histogram filter.

9. The apparatus according to claim 7, before the matching a current point cloud projected image of a first resolution with a map of the first resolution to generate a first histogram filter based on the matching result, the operations further comprise:

acquiring point cloud data of a specified area, and rasterizing the acquired data to obtain the map of the first resolution, wherein the map of the first resolution comprises statistical information of reflection values and/or statistical information of height values of point clouds projected onto a grid; and acquiring point cloud data of a current frame, and rasterizing the point cloud data of the current frame to obtain the current point cloud projected image of the first resolution, wherein the current point cloud projected image of the first resolution comprises statistical information of reflection values and/or statistical information of height values of point clouds projected onto the grid.

10. The apparatus according to claim 9, wherein the matching a current point cloud projected image of a first resolution with a map of the first resolution to generate a first histogram filter based on the matching result comprises:

matching the current point cloud projected image of the first resolution with the map of the first resolution based on statistical information of reflection values in the current point cloud projected image of the first resolution and statistical information of reflection values in the map of the first resolution, to generate a first reflection value histogram filter based on the matching result; and/or matching the current point cloud projected image of the first resolution with the map of the first resolution based on statistical information of height values of grids in the current point cloud projected image of the first resolution and statistical information of height values of grids in the map of the first resolution, to generate a first height value histogram filter based on the matching result.

11. The apparatus according to claim 10, wherein the determining at least two first response areas in the first histogram filter based on a probability value of an element in the first histogram filter comprises:
  determining a contribution ratio of the first reflection value histogram filter to the at least two first response areas and a contribution ratio of the first height value histogram filter to the at least two first response areas; and
  determining elements corresponding to the at least two first response areas in the first reflection value histogram filter and the first height value histogram filter respectively based on the contribution ratios, to determine the at least two first response areas.

12. The apparatus according to claim 7, wherein the determining a probability value of an element corresponding to the second response area in the pre-established second histogram filter based on the result of matching the current point cloud projected image of the second resolution with the map of the second resolution, to generate the second histogram filter corresponding to the current point cloud projected image of the second resolution comprises:
  acquiring a second histogram filter corresponding to a point cloud projected image of a last frame;
  determining a Bayesian prior probability based on a probability value of an element in the second histogram filter corresponding to the point cloud projected image of the last frame;
  determining a Bayesian conditional probability based on a matching degree of the current point cloud projected image of the second resolution and the map of the second resolution, obtaining the probability value of the element corresponding to the second response area in the second histogram filter using Bayes rule; and
  setting a probability value of other element in the second histogram filter as a preset value.

13. A non-transitory computer readable medium, storing a computer program thereon, wherein the computer program, when executed by a processor, causes the processor to perform operations, the operations comprising:
  matching a current point cloud projected image of a first resolution with a map of the first resolution to generate a first histogram filter based on the matching result;
  determining at least two first response areas in the first histogram filter based on a probability value of an element in the first histogram filter, the probability value of the element corresponding to each of the at least two first response areas being greater than a probability value of another element in the first histogram filter;
  generating a second histogram filter corresponding to a current point cloud projected image of a second resolution based on a result of matching a-the current point cloud projected image of the second resolution with a map of the second resolution and the at least two first response areas, the first resolution being less than the second resolution by: mapping the determined at least two first response areas to a pre-established second histogram filter to determine a second response area in the pre-established second histogram filter; and determining a probability value of an element corresponding to the second response area in the pre-established second histogram filter based on the result of matching the current point cloud projected image of the second resolution with the map of the second resolution, to generate the second histogram filter corresponding to the current point cloud projected image of the second resolution; and
  calculating a weighted average of probability values of target elements in the second histogram filter to determine a positioning result of the autonomous vehicle in the map of the second resolution.

* * * * *